(12) United States Patent
Sanchez-Garcia

(10) Patent No.: US 8,212,771 B1
(45) Date of Patent: Jul. 3, 2012

(54) INTERCONNECTED COMPUTER MOUSE AND PAD

(76) Inventor: Raul A. Sanchez-Garcia, Lancaster, CA (US)

( * ) Notice: Subject to any disclaimer, the term of this patent is extended or adjusted under 35 U.S.C. 154(b) by 633 days.

(21) Appl. No.: 12/383,374

(22) Filed: Mar. 24, 2009

Related U.S. Application Data

(60) Provisional application No. 61/070,270, filed on Mar. 24, 2008.

(51) Int. Cl.
*G06F 3/33* (2006.01)
*G09G 5/08* (2006.01)

(52) U.S. Cl. ........ 345/161; 345/157; 345/163; 345/164; 345/167; 345/179

(58) Field of Classification Search .......... 345/156–169, 345/173, 175, 179, 184; 382/115, 305; 463/30, 463/37, 38
See application file for complete search history.

(56) References Cited

U.S. PATENT DOCUMENTS

| | | | | |
|---|---|---|---|---|
| 5,164,713 | A * | 11/1992 | Bain | 715/862 |
| 5,581,277 | A * | 12/1996 | Tajiri | 345/163 |
| 5,754,711 | A * | 5/1998 | Shimizu et al. | 382/305 |
| 5,805,144 | A | 9/1998 | Scholder et al. | |
| 5,841,426 | A | 11/1998 | Dodson et al. | |
| 5,990,869 | A | 11/1999 | Kubica et al. | |
| 6,043,808 | A * | 3/2000 | Perry | 345/163 |
| 6,097,374 | A * | 8/2000 | Howard | 345/168 |
| 6,191,774 | B1 | 2/2001 | Schena et al. | |
| 6,304,252 | B1 * | 10/2001 | Elledge | 345/179 |
| 6,351,260 | B1 | 2/2002 | Graham et al. | |
| 6,366,274 | B1 * | 4/2002 | Elledge | 345/163 |
| 6,400,356 | B1 * | 6/2002 | Bidiville et al. | 345/163 |
| 6,504,528 | B1 | 1/2003 | Kermani et al. | |
| 6,593,911 | B1 | 7/2003 | Murphy | |
| 6,606,244 | B1 * | 8/2003 | Liu et al. | 361/679.48 |
| 6,747,634 | B1 * | 6/2004 | Yang | 345/168 |
| 7,006,074 | B2 * | 2/2006 | Chesters | 345/156 |
| 7,227,530 | B1 * | 6/2007 | Yang | 345/158 |
| 7,489,296 | B2 * | 2/2009 | Nishino et al. | 345/157 |
| 7,898,523 | B1 * | 3/2011 | Van Meter | 345/158 |
| 2004/0017355 | A1 * | 1/2004 | Shim | 345/157 |
| 2004/0028294 | A1 * | 2/2004 | Fukuda | 382/305 |
| 2006/0152484 | A1 * | 7/2006 | Rolus Borgward | 345/157 |
| 2007/0097078 | A1 * | 5/2007 | Chin | 345/166 |

* cited by examiner

*Primary Examiner* — Prabodh M Dharia
(74) *Attorney, Agent, or Firm* — Montgomery Patent & Design, LLC; Robert C. Montgomery; Joseph T. Yaksich

(57) ABSTRACT

A computer mouse with an integral attached mouse pad is herein disclosed. The top portion of the mouse moves conventionally while the base is equipped with sliding X-Y access plates having a protruding analog stick. The bottom surface of the base plate comprises a non-slip material. The top portion has both left and right mouse buttons as found on a conventional mouse. In use, the top portion of the device slides in relation to the base generating higher resolution computer cursor movements. This device is ideal for use on desktops with crowded spaces or for with notebook computers.

12 Claims, 7 Drawing Sheets

INTERCONNECTED COMPUTER MOUSE AND PAD

RELATED APPLICATIONS

The present invention was first described in U.S. Provisional Patent Application No. 61/070,270 filed on Mar. 24, 2008, the entire disclosures of which are incorporated herein by reference.

FIELD OF THE INVENTION

The present invention relates generally to a computer mouse and, more particularly, to an interconnected computer mouse and pad.

BACKGROUND OF THE INVENTION

One (1) of the most common computer accessories is the computer mouse. Various versions such as mechanical/optical encoders, laser mice, trackballs, touchpad, and the like are readily available to suit almost any user's preference. Many of these devices are of a large size compared to the space occupied by a typical mouse pad. When using the conventional mouse, the device detects two-dimensional motion of the mouse relative to a supporting surface and translates such motion into a pointing movement on a computer screen. This motion translation requires ample space to perform tasks effectively. Often, space is limited on a desktop and users find themselves continually fighting with the mouse, the mouse cord, and the pad itself. A regular problem with a conventional mouse used in a limited space is that users find they must continually pick up the mouse device and reposition it in order to accurately reach a desired location with the pointer on the computer screen.

Various attempts have been made in the past to overcome these disadvantages and provide a computing mouse device without the aforementioned problems. Among the relevant attempts to address these problems are several U.S. Patents, including U.S. Pat. Nos. 5,841,426; 5,990,869; 6,191,774 and 6,504,528.

U.S. Pat. No. 5,805,144, issued in the name of Scholder et al., describes a mouse pointing device and a method of providing movement and position data using a mouse device comprising a mouse body, a movement tracking mechanism, and a user position tracking mechanism. The Scholder device uses the tracking mechanism to produce data regarding the movement of the body in relation to a substantially planer surface and the user position tracking mechanism which provides a pressure sensitive means of enabling the user to enter the third dimension in relation to the movement of the mouse device.

U.S. Pat. No. 6,351,260, issued in the name of Graham et al., describes a user input device for electronic devices comprising a grid of light produced from a light source which provides positional information using the grid of light.

U.S. Pat. No. 6,593,911, issued in the name of Murphy, describes an infrared cordless mouse with mouse pad receiver comprising a transmission port which transmits a light signal downwardly into the mouse pad receiver. The mouse pad receiver comprises two sections directs and receives light signals from the mouse and transmits the signals to a computer.

While these devices fulfill their respective, particular objectives, each of these references suffers from one or more of the aforementioned disadvantages. Accordingly, there exists a need for a means by which the functionality and feel of a conventional computer mouse can be provided in a device which utilizes less physical space while still producing outstanding resolution. The development of the invention herein described fulfills this need.

SUMMARY OF THE INVENTION

In view of the foregoing references, the inventor recognized the aforementioned inherent problems and observed that there is a need for an interconnected computer mouse and pad and thus, the object of the present invention is to solve the aforementioned disadvantages.

To achieve the above objectives, it is an object of the present invention to provide an interconnected computer mouse and pad, which provides a means for a computer pointing device with an integrated surface for improved operation which functions similar to a conventional computer mouse and mouse pad, yet requires less physical space. The apparatus is utilized in conjunction with a desktop computer or notebook computer and is positioned to the side of a keyboard in the general position usually occupied by a conventional computer mouse or similar pointing device.

Another object of the present invention is to provide an apparatus comprising a stationary lower plate, a movable upper plate, a grippable protrusion, an X-Y axis control, a pair of auxiliary controls, a track system, a vertical rod pair, a horizontal rod pair, a wheel guide, movement encoders, a junction point, a central circuit board, a connection cable, a connection plug and all associated electrical and electronic components.

Yet still another object of the present invention is to provide the stationary lower plate comprising a base plate of the apparatus which remains stationary on a desktop, counter, or other horizontal surface.

Yet still another object of the present invention is to provide the movable upper plate which provides a means of mimicking a desired direction of a cursor on a screen portion of a computing device and works in conjunction with the X-Y axis control and the tracking system. The X-Y axis control and tracking system provide a means to separate, support, and control the stationary lower plate and the movable upper plate.

Yet still another object of the present invention is to provide the grippable protrusion comprising a generally knob shaped portion located at a top center portion of the movable upper plate which provides a gripping means for a hand of the user.

Yet still another object of the present invention is to provide the auxiliary controls comprising button-style switches located in an adjacent area to the grippable protrusion which provide various additional means of user interface and computing functions similar to a standard left and right control button on a conventional mouse device.

Yet still another object of the present invention is to provide the vertical rod pair and the horizontal rod pair which provide a means to support the tracking functionality of the apparatus and are each arranged in a parallel manner to themselves and in a perpendicular manner to each other.

Yet still another object of the present invention is to provide the wheel guide which provides a means to support each distal end of the vertical rod pair and horizontal rod pair. The ends of the vertical rod pair and the horizontal rod pair are inserted into the wheel guide and provide an axle system.

Yet still another object of the present invention is to provide the movement encoders which are attached to the wheel guides and which provide a means of converting the two-dimensional movement of the movable upper plate to discrete signals in the "X" and the "Y" directions.

Yet still another object of the present invention is to provide the junction point at the intersection of the vertical rod pair and the horizontal rod pair which comprises a circular receiver for the grippable protrusion to reside as provided on the movable upper plate. As the grippable protrusion is moved in the "X" or "Y" direction, the vertical rod pair and the horizontal rod pair move as well thus, relative movement of the grippable protrusion results in the generation of corresponding electrical signals relative to the speed and position of the movement.

Yet still another object of the present invention is to provide the tracking system comprising a pathway which borders the stationary lower plate and provides a guide for the wheel guides to travel within. The tracking system provides a means of smooth movement between the movable upper plate and the stationary lower plate.

Yet still another object of the present invention is to provide the central circuit board which receives signals from the movement encoders and the auxiliary controls and provides a means of processing those input signals and transmitting an appropriate output signal which is understood by a personal computing device.

Yet still another object of the present invention is to provide a means of interconnection of the apparatus to a computing device comprising a connection cable and a connection cable plug.

Yet still another object of the present invention is to provide a method of utilizing the use of the interconnected computer mouse and pad which provides for comfortable, long-term use of a mouse in a manner which is not only quick, easy, and effective, but in a manner that utilizes less physical space.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
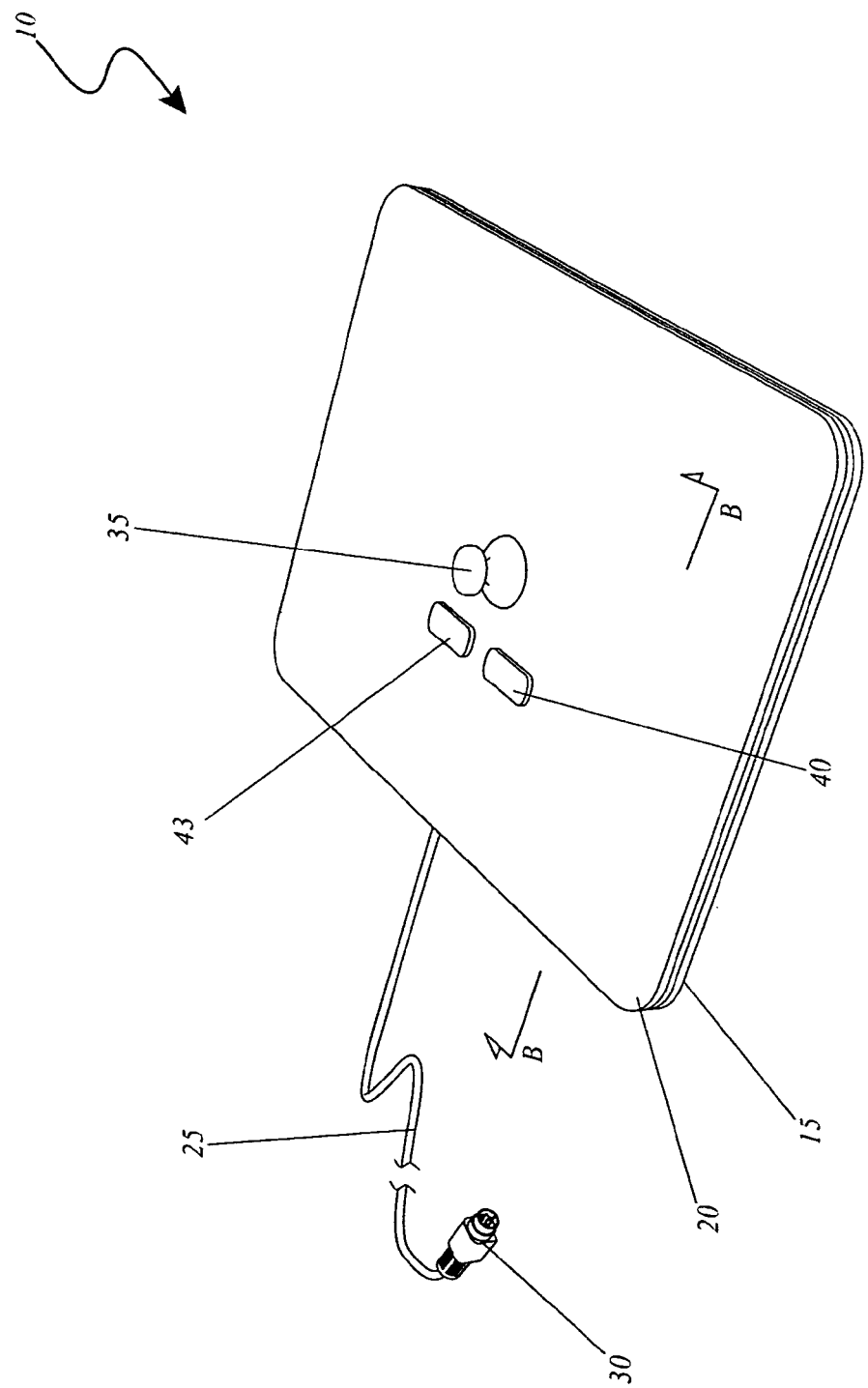
FIG. 1 is a perspective view of an interconnected computer mouse and pad 10, according to the preferred embodiment of the present invention.

| DESCRIPTIVE KEY |
| --- |
| 10 interconnected computer mouse and pad |
| 15 stationary lower plate |
| 20 movable upper plate |
| 25 connection cable |
| 30 connection plug |
| 35 grippable protrusion |
| 40 primary auxiliary control |
| 43 secondary auxiliary control |
| 45 X-Y axis control |
| 50 vertical rod pair |
| 55 horizontal rod pair |
| 60 wheel guide |
| 65 movement encoders |
| 70 interconnecting wiring |
| 75 central circuit board |
| 80 junction point |
| 90 track system |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for an interconnected computer mouse and pad (herein described as the "apparatus") 10, which provides a means for a computer pointing device with an integrated surface for improving the operation thereof. Said apparatus 10 comprises a stationary lower plate 15, a movable upper plate 20, a connection cable 25, a connection plug 30, a grippable protrusion 35, a pair of auxiliary controls 40, 43, a track system 90, and associated electrical and electronic components. Said apparatus 10 functions similar thereto a conventional computer mouse and mouse pad, yet requires less physical space. Said apparatus 10 is utilized in conjunction with a desktop computer or notebook computer and is positioned to the side of a keyboard in the general position usually occupied by a conventional computer mouse or similar pointing device.

Figure 2:
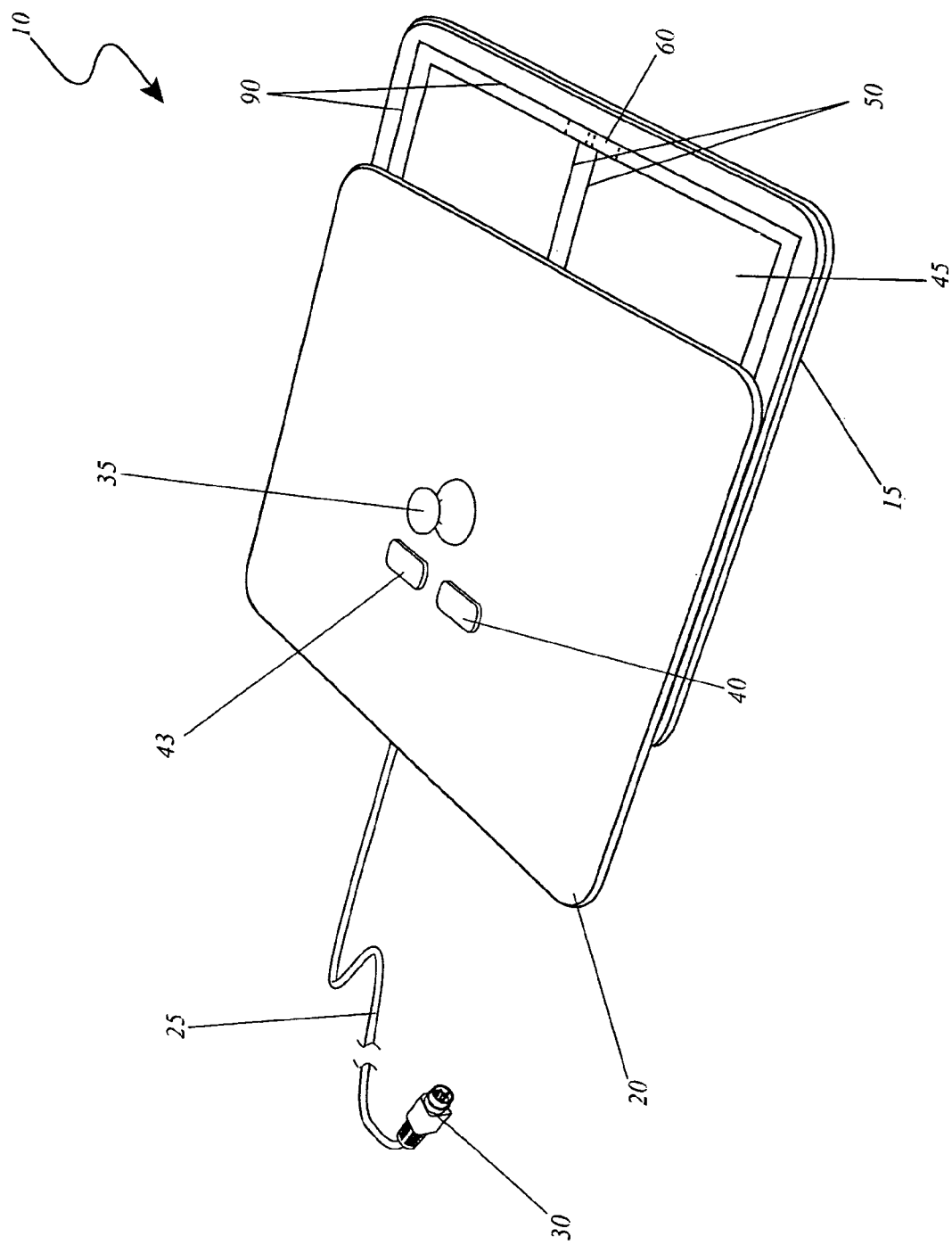
FIG. 2 is a perspective view of the interconnected computer mouse and pad 10 depicting a partially deployed state, according to the preferred embodiment of the present invention.

Referring now to FIG. 1, a perspective view of the apparatus 10 and FIG. 2 a perspective view of the apparatus 10 depicting a partially deployed state, according to the preferred embodiment of the present invention, are disclosed. While depicted as a separate component or computer accessory for the purposes of illustration, the apparatus 10 could be built-in as an integral part of other computing devices such as a keyboard assembly, a portable or "notebook" computer, or the like, and as such, the independent and separate configuration of said apparatus 10 should not be interpreted as a limiting factor of the present invention.

The apparatus 10 comprises two (2) major physical components, a stationary lower plate 15 and a movable upper plate 20. The stationary lower plate 15 forms the base plate of the apparatus 10 and would remain stationary on a desktop, counter, or other horizontal surface. The movable upper plate 20 mimics the desired direction of a cursor on a screen portion of a computing device and works in conjunction with an X-Y axis control 45 and tracking system 90 (see FIGS. 4a and 4b). The stationary lower plate 15 and movable upper plate 20 are fabricated from a plastic material, yet other materials may be incorporated without limiting the functions of the apparatus 10. The stationary lower plate 15 and the movable upper plate 20 are separated, supported and controlled by a moving X-Y axis control 45 and track system 90 which will be described in greater detail herein below. The overall dimensions of the apparatus 10 are approximately two (2) inches in length to four (4) inches in width.

The apparatus 10 is interconnected to a computing device by use of a connection cable 25 and a connection plug 30. The connection plug 30 would be a conventional PS2 or USB connection plug that is well known in the art. However, other combinations such as older serial port mouse connections as well as proprietary connections should be considered eligible as well. Said connection cable 25 and a connection plug 30 are located on a front side portion of the apparatus 10.

A grippable protrusion 35 is located at a top center portion of the movable upper plate 20 and serves as a grasping area for a human hand during use. While depicted as generally "knob-shaped" for the purposes of illustration, it should be noted that the grippable protrusion 35 can take the shape of a computer mouse, a joy stick, a lever or other similar shape which is not only easy to grasp but provides comfort and increased control when used for long periods of time. Said grippable protrusion 35 is fabricated from a material such as, but not limited to: plastic, rubber, or the like.

A pair of auxiliary controls 40, 43 such as button-style switches to produce left and right clicks is provided as well in the area of the grippable protrusion 35. Said auxiliary controls 40, 43 provide the user with selection options similar thereto conventional computer pointing devices such as, but not limited to: highlighting an object, dragging an object, or the like. A primary auxiliary control 40 is located on an upper left side of the grippable protrusion 35 and simulates functions similar to a conventional left button thereon computer pointing devices. A secondary auxiliary control 43 is located on an upper right side of the grippable protrusion 35 and simulates functions similar to a conventional right button thereon a computer pointing devices. Exact placement of the auxiliary controls 40, 43 would depend on the exact configuration of the grippable protrusion 35 as well as specific model preferences. Said auxiliary controls 40, 43 are connected to a central circuit board 75 therewith interconnecting wire 70 (see FIG. 5).

Figure 3A:
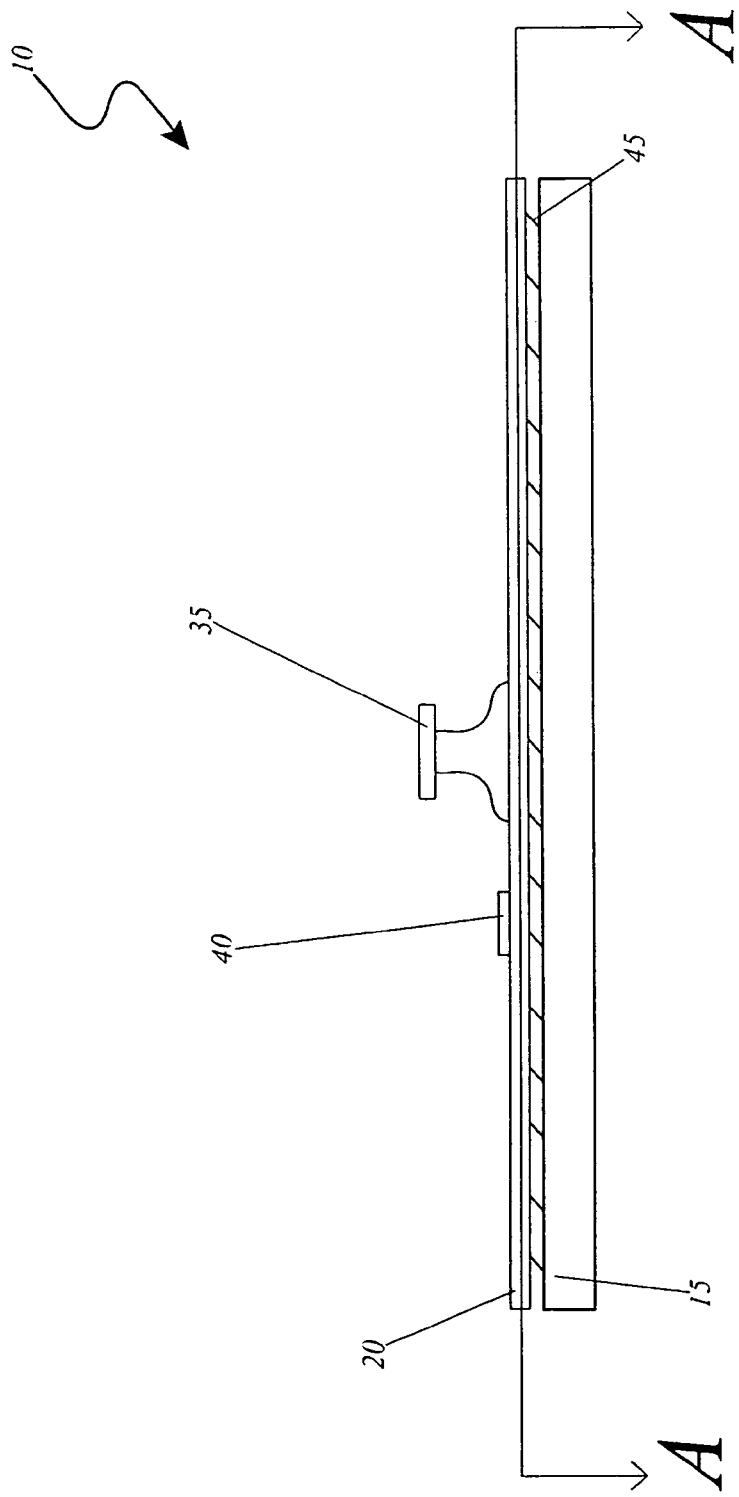
FIG. 3a is a side view of the interconnected computer mouse and pad 10, according to the preferred embodiment of the present invention.
Figure 3B:
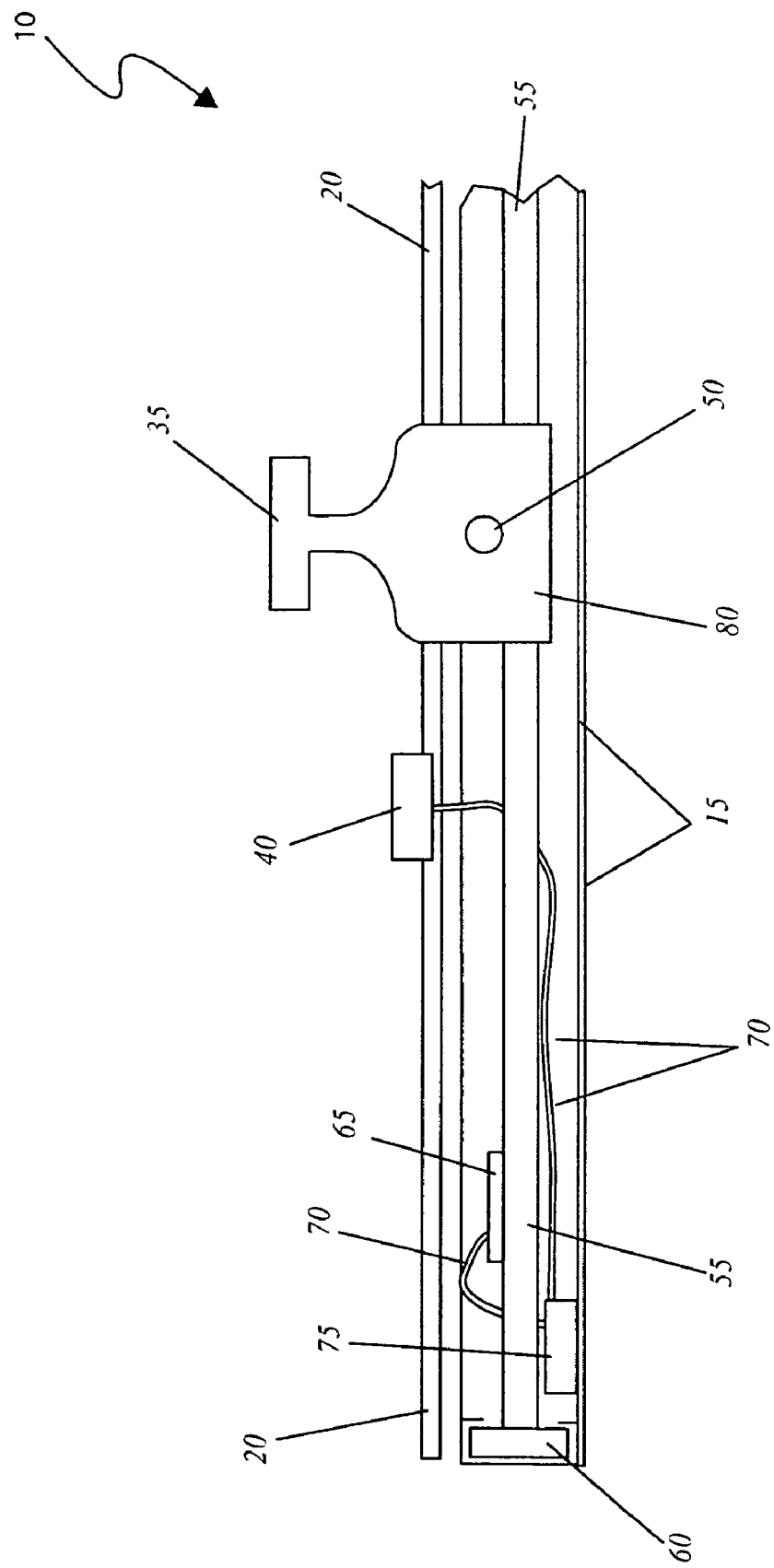
FIG. 3b is a sectional view of the interconnected computer mouse and pad 10 as seen along line B-B, as shown in FIG. 1, according to the preferred embodiment of the present invention.

Referring now to FIG. 3A, a side view of the apparatus 10 and FIG. 3B a sectional view of the apparatus 10 as seen along line B-B, as shown in FIG. 1, according to the preferred embodiment of the present invention, are disclosed. These figures more clearly show the relationship between the stationary lower plate 15 and the movable upper plate 20. An X-Y axis control 45 is clearly visible between the stationary lower plate 15 and the movable upper plate 20 and will be described in greater detail herein below. The overall thickness of the interconnected computer mouse and pad 10 is approximately one-quarter (¼) inch to one-half (½) inch in a typical configuration, but could be greater in the case of desktop usage for drawing/gaming applications, or could be thinner in the instance of the interconnected computer mouse and pad 10 being incorporated into a portable laptop computer. Additionally, the grippable protrusion 35 is present on the movable upper plate 20 as aforementioned described. Said grippable protrusion 35 is integrally connected thereto the junction point 80 (also see FIGS. 4a and 4b). Further, the auxiliary control devices 40 is also present on the movable upper plate 20 as aforementioned described and interconnected thereto the central circuit board 75 therewith interconnecting wiring 70.

Figure 4A:
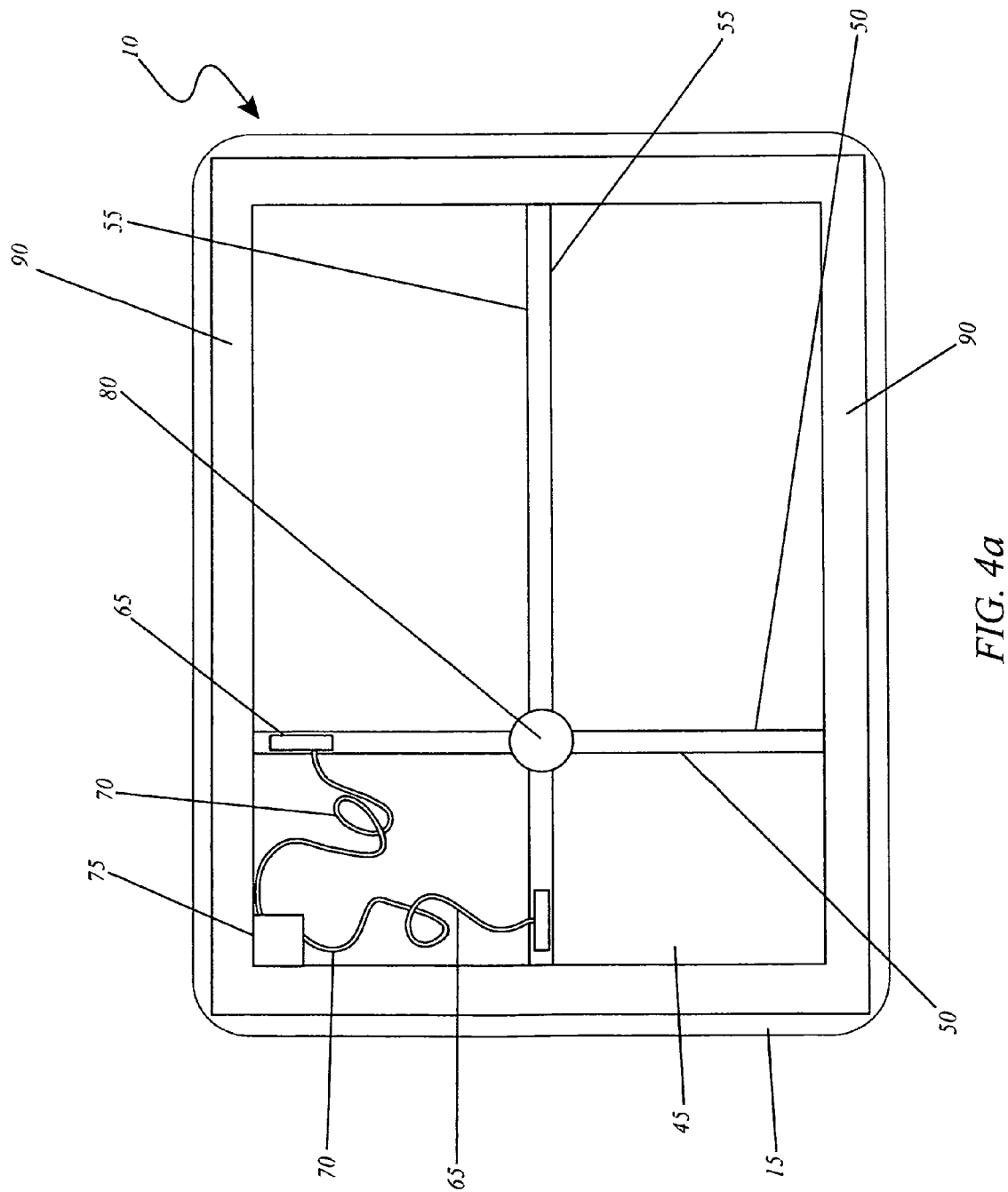
FIG. 4a is a sectional view of the interconnected computer mouse and pad 10 as seen along a line A-A, as shown in FIG. 3, according to the preferred embodiment of the present invention.
Figure 4B:
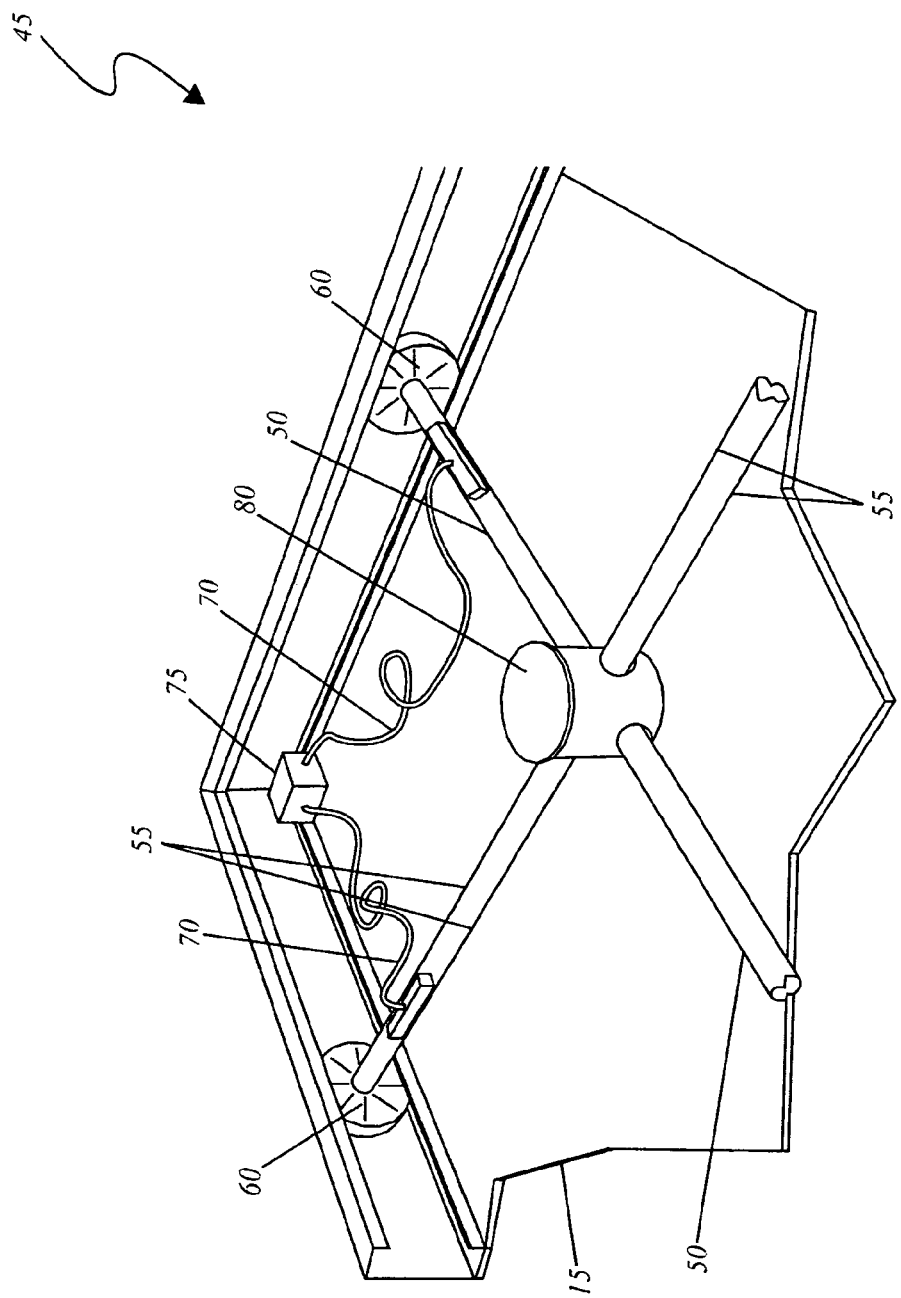
FIG. 4b is a close-up view of a X-Y axis control 45, according to the preferred embodiment of the present invention; and, FIG. 5 is an electrical block diagram of the interconnected computer mouse and pad 10 depicting the major electrical components, according to the preferred embodiment of the present invention.

Referring now to FIG. 4a, a sectional view of the apparatus 10 taken along a section line A-A, as shown in FIG. 3a, and FIG. 4b a close-up view of an X-Y axis control 45, according to the preferred embodiment of the present invention, is disclosed. The apparatus 10 comprises an X-Y axis control 45, a vertical rod pair 50, a horizontal rod pair 55, a wheel guide 60, and a tracking system 90. These figures more clearly depict the X-Y axis control 45 and its various components. A vertical rod pair 50 and horizontal rod pair 55 form the basis of support for the tracking functionality of the apparatus 10. The vertical rod pair 50 and horizontal rod pair 55 are each arranged in a parallel manner to themselves and in a perpendicular manner to each other. The ends of the vertical rod pair 50 and horizontal rod pair 55 are supported by a wheel guide 60 at each of the four (4) end locations. The end portions of the vertical rod pair 50 and horizontal rod pair 55 are inserted thereinto the wheel guide 60 creating an axle system. Said wheel guide 60 is positioned thereon a tracking system 90, thereby providing a pathway for the wheel guides 60 to travel. Said tracking system 90 borders the entire stationary lower plate 15. Said support provides a smooth surface to glide the movable upper plate 20 (as shown in FIG. 1) and provides responsive tactile feedback for usage of the interconnected computer mouse and pad 10.

Two (2) of the above mentioned wheel guides 60 comprise graduated radiating lines thereon a front surface, thereby enabling the movement encoders 65 to relay positional information to a central circuit board 75. Said movement encoders 65 are located on an end portion of the vertical rod pair 50 and horizontal rod pair 55 and are directed toward a respected wheel guide 60. Said movement encoders 65 convert the movement of the X-Y axis control 45 to discrete electrical impulses in the "X" and "Y" directions. A preferred method of encoding is to be laser diode based for purposes of accurate resolution. However, other methods of encoding including slotted wheel, potentiometer type, and other methods of encoding yet to be established as standards could be utilized as well, and as such, should not be interpreted as a limiting factor of the present invention. The electronic signals as generated by the movement encoders 65 are carried by interconnecting wiring 70 to the central circuit board 75.

The intersection of the vertical rod pair 50 and the horizontal rod pair 55 form a junction point 80 which is circular in nature and always of the same size regardless of the location of either the vertical rod pair 50 or horizontal rod pair 55 anywhere on the stationary lower plate 15. It is in this junction point 80 which the grippable protrusion 35 (as shown in FIG. 1) as provided on the movable upper plate 20 (as shown in FIG. 1) resides. As such, as the grippable protrusion 35 is moved in the "X" or "Y" direction, the vertical rod pair 50 and the horizontal rod pair 55 move as well. Thus, relative movement of the grippable protrusion 35 results in the generation of corresponding electrical signals relative to the speed and position of the movement.

Figure 5:
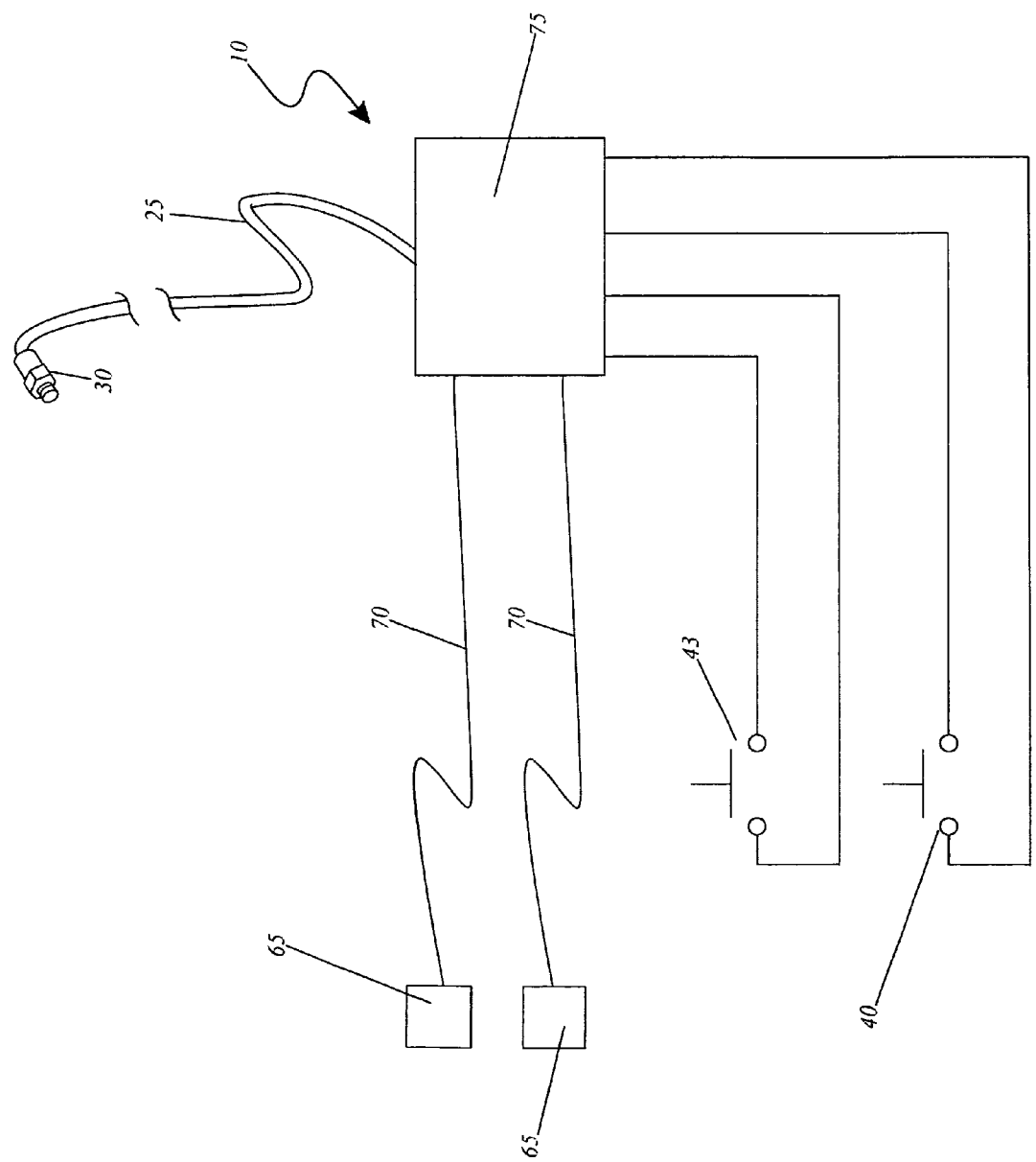

Referring now to FIG. 5, an electrical block diagram of the apparatus 10 depicting the major electrical components, according to the preferred embodiment of the present invention, is disclosed. The electrical signals from both of the movement encoders 65 are routed to the central circuit board 75 along with signals from any and all of the auxiliary control devices 40 as shown. The central circuit board 75 then performs the necessary signal conditioning along with any of the synchronization and modulation of the signals provided into a resultant signal that can be used by any conventional personal computer. Such signal conditioning, synchronization and modulation are well-known in the art and not within the scope of the present invention. The resultant signal is envisioned to follow the following standards:

Pin connection would be derived as shown in Table 1:

TABLE 1

| Pin | Name | Dir | Description |
|---|---|---|---|
| 1 | DATA | ↔ | Key Data |
| 2 | n/c | — | Not connected |
| 3 | GND | — | Gnd |
| 4 | VCC | → | Power, +5 VDC |
| 5 | CLK | → | Clock |
| 6 | n/c | — | Not connected |

Note:
Direction is Computer relative Mouse.

Various name descriptions are as follows:

Data—Mouse data packets or keyboard scan codes are sent from the mouse or keyboard to the computer on this single wire serially.

Clock—This signal is sent from the mouse or keyboard to synchronize the data signal.

+5 Vdc—This is a simple 5 volts signal for giving power to the mouse or keyboard.

Ground—This is a common ground signal used as a return path for data and is a reference to logical 0.

The CLK and DATA lines control bi-directional transmission. Both are fed by an open collector device which lets either host or mouse force the line to "0". During non-transmission, CLK is at "1" and DATA can be at "0" or "1".

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2.

The method of installing and utilizing the apparatus 10 may be achieved by performing the following steps: acquiring the apparatus 10; placing said apparatus 10 at a desired location relative to a computing device; connecting the connection plug 30 to an appropriate output thereon a computing device; placing a hand on the grippable protrusion 35; directing said grippable protrusion 35 to a left or right direction, thereby moving the Y-axis wheel guides 60 along the track system 90, and simulating movement along the X-axis of a X-Y axis control 45; directing said grippable protrusion 35 to an up or down direction, thereby moving the X-axis wheel guides 60 along the track system 90, and simulating movement along the Y-axis of a X-Y axis control 45; mimicking a desired location for the cursor on a screen of the computing device therewith the movement of the movable upper plate 20; enabling the movement encoders 65 thereto transfer data to the central circuit board 75 therewith interconnecting wire 70; utilizing as necessary; and, enjoying the freedom to control a computing device in a small space with no hassle.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A computer pointing device comprising an integrated surface for improved operation in electronic communication with a computer further comprises:
   a stationary lower plate;
   a movable upper plate adjustably attached and movable relative to said stationary lower plate by an X-Y axis control assembly, said X-Y axis control assembly further comprising:
      a track system attachable to an outer periphery of said stationary lower plate, comprising a pair of horizontal tracks and a pair of vertical tracks;
      a horizontal rod pair comprising a pair of first wheel guides attached to each distal end of said horizontal rod pair and slidably engaging with said pair of horizontal tracks;
      a vertical rod pair comprising a pair of second wheel guides attached to each distal end of said vertical rod pair and slidably engaging with said pair of vertical tracks;
      a junction point, comprising a means of adjoining each proximal end of said horizontal rod pair and each proximal end of said vertical rod pair with a grippable protrusion;
   said grippable protrusion centrally located of said movable upper plate for providing a gripping and directing means for said movable upper plate;
   a pair of auxiliary controls located adjacent to said grippable protrusion on said movable upper plate for providing auxiliary control functions to said computer;
   a central circuit board in electronic communication with said X-Y-axis control assembly and said pair of auxiliary controls; and,
   a connection cable in electronic communication with said computer;
   wherein said computer pointing device provides a means of producing a desired cursor movement on a screen portion of said computer;
   wherein said X-Y axis control assembly provides a means to separate, support, and control said movable upper plate relative to said stationary lower plate, thereby providing said cursor movement;
   wherein said pair of first wheel guides and said second pair of wheel guides travel within said pair of horizontal tracks and said pair of vertical tracks, respectively, thereby providing a two-dimensional movement; and,
   wherein said central circuit board processes said desired cursor movement and said auxiliary control functions to said computer through said connection cable.

2. The device of claim 1, wherein said stationary lower plate comprises a base plate which remains stationary when placed on a horizontal surface.

3. The device of claim 2, wherein said computer pointing device comprises approximately two inches in length and four inches in width.

4. The device of claim 2, wherein said computer pointing device comprises approximately one-quarter to one-half inch in thickness.

5. The device of claim 1, further comprising a first movement encoder attached to one of said horizontal rod pair adjacent to one of said pair of first wheel guides and a second movement encoder attached to one of said vertical rod pair adjacent to one of said pair of second wheel guides and in electronic communication with said central circuit board;
  wherein said first movement encoder and said second movement encoder each reads graduated radiating lines on a front surface of said one of said pair of first wheel guides and one of said pair of second wheel guides;
  wherein said first movement encoder and said second movement encoder each relays positional information to said central circuit board, which provides a converting means of said two-dimensional movement to said desired cursor movement.

6. The device of claim 5, wherein said first movement encoder and said second movement encoder are each laser diode-based to provide accurate resolution.

7. The device of claim 1, wherein said grippable protrusion comprises a knob-shaped portion located at a top center portion of said movable upper plate and a bottom portion extending through said movable plate.

8. The device of claim 7, wherein said junction point further comprises a circular receiver for said bottom portion of said grippable protrusion.

9. The device of claim 1, wherein said pair of auxiliary controls comprises button-style switches providing said auxiliary control functions which comprise computing functions similar to a standard left control button and a standard right control button on a conventional computer pointing device.

10. The device of claim 9, wherein said pair of auxiliary controls further comprise:
  a primary auxiliary control located on an upper left side of said grippable protrusion, thereby simulating functions similar to said standard left control button; and,
  a secondary auxiliary control located on an upper right side of said grippable protrusion, thereby simulating functions similar to said standard right control button.

11. The device of claim 1, wherein said central circuit board is located on a bottom surface of said stationary plate and providing a clearance for said means to separate, support, and control said movable upper plate relative to said stationary lower plate.

12. The device of claim 1, wherein said connection cable is connected to an input port of said computer and transmits said desired cursor movement and said auxiliary control functions to said computer for processing.

\* \* \* \* \*